United States Patent [19]

Tsujita et al.

[11] 4,365,265
[45] Dec. 21, 1982

[54] COLOR TEMPERATURE CONTROL CIRCUIT

[75] Inventors: Kaoru Tsujita, Katano; Sigeki Tobioka, Gifu; Ikuo Monden, Ota, all of Japan

[73] Assignee: Sanyo Electric Co., Ltd., Moriguchi, Japan

[21] Appl. No.: 275,296

[22] Filed: Jun. 19, 1981

[30] Foreign Application Priority Data

Jun. 20, 1980 [JP] Japan .............................. 55-87100[U]

[51] Int. Cl.³ .......................................... H04N 9/535
[52] U.S. Cl. ..................................................... 358/29
[58] Field of Search .......................................... 358/29

[56] References Cited

U.S. PATENT DOCUMENTS 3,562,410 2/1971 Lovely .................................. 358/29
4,064,529 12/1977 Seer ....................................... 358/29

Primary Examiner—Richard Murray
Attorney, Agent, or Firm—Armstrong, Nikaido, Marmelstein & Kubovcik

[57] ABSTRACT

A color temperature control circuit for use in a color television receiver includes a first differential amplifier which compares a luminance signal with a reference voltage and when the luminance signal drops below the reference voltage, it is so actuated as to derive a current from a green chrominance signal to reduce the green chrominance signal level, and the second differential amplifier which compares the luminance signal with the reference voltage and when the luminance signal drops below the reference voltage, it is so actuated as to derive a current from a red chrominance signal to reduce the red chrominance signal level. When the first and the second differential amplifiers are actuated, signal level of a blue chrominance signal is apparently increased to turn a white image to a bluish white image.

7 Claims, 5 Drawing Figures

COLOR TEMPERATURE CONTROL CIRCUIT

The present invention relates to a color television receiver and, more particularly, to a color temperature control circuit for controlling the chrominance signals.

Generally, the color television receiver has a chrominance signal demodulator from which chrominance signals of blue (B-Y), and red (R-Y) and green (G-Y) are produced. These chrominance signals B-Y, R-Y and G-Y are applied to a matrix circuit together with a luminance signal $-Y$ obtained from a video amplifier. The matrix circuit, processing the chrominance signals with the luminance signal, produces color signals B, R and G which are applied to a cathode ray tube for producing color beams of blue, red and green, respectively. These three color beams are mixed with each other on a phospher screen in the cathode ray tube to produce a desired color on the screen relative to the received television signal.

When a television signal of color white is received, the chrominance signals B-Y, R-Y and G-Y show approximately the same level with each other, and, at the same time, the luminance signal $-Y$ of negative going waveform shows a relatively low level. Thus, a generated bundle of blue, red and green beams has a considerably high beam current in total, and accordingly, a high luminance white image, such as snow or superimposed character, is produced on a corresponding section on the screen with a high contrast. More particularly, such a white image, having a color temperature of approximately 9300° K., is so bright that the high contrast between the white image and a background image often results in cross-color between the images, and thus adversely affecting the sharpness of the image.

In order to solve the above problem, it has been proposed to change the color temperature of white to a higher degree, such as 15000° K., resulting in change of color from luminous white to bluish white or light blue. According to one conventional method, the change of color temperature of white to a higher degree is effected by the increase of blue signal B. This method, however, may result in saturation of blue signal B, and thus the ratio of color signals B, R and G will not result in a desired ratio. Furthermore, such a saturation of blue signal B results in an undesirable increase of contrast of a white image.

Accordingly, it is a primary object of the present invention to provide an improved type of color temperature control circuit which decreases the red and green chrominance signals to apparently increase the blue chrominance signal, and thus apparently increasing the blue signal B.

It is another object of the present invention to provide a color temperature control circuit of the above described type which can be operated with high accuracy.

It is also another object of the present invention to provide a color temperature control circuit of the above described type which is simple in construction and can readily be manufactured at low cost.

In accomplishing these and other objects, a color temperature control circuit according to the present invention comprises a reference voltage generator for generating a predetermined reference voltage and first and second differential amplifiers. The first differential amplifier is connected to the chrominance signal demodulator for defining a first current path for the green chrominance signal to ground, and it is also connected to the reference voltage generator and the video amplifier for comparing the luminance signal with the reference voltage such that when the luminance signal drops below the reference voltage, the first current path actuates to conduct the green chrominance signal to ground with a conductivity determined by the degree of the voltage drop of luminance signal below the reference voltage to reduce the green chrominance signal level. The second differential amplifier is connected to the chrominance signal demodulator for defining a second current path for the red chrominance signal to ground, and it is also connected to the reference voltage generator and the video amplifier for comparing the luminance signal with the reference voltage such that when the luminance signal drops below the reference voltage, the second current path actuates to conduct the red chrominance signal to ground with a conductivity determined by the degree of the voltage drop of luminance signal below the reference voltage to reduce the red chrominance signal level.

These and other objects and features of the present invention will become apparent from the following description taken in conjunction with a preferred embodiment thereof with reference to the accompanying drawings, throughout which like parts are designated by like reference numerals, and in which.

Figure 1:
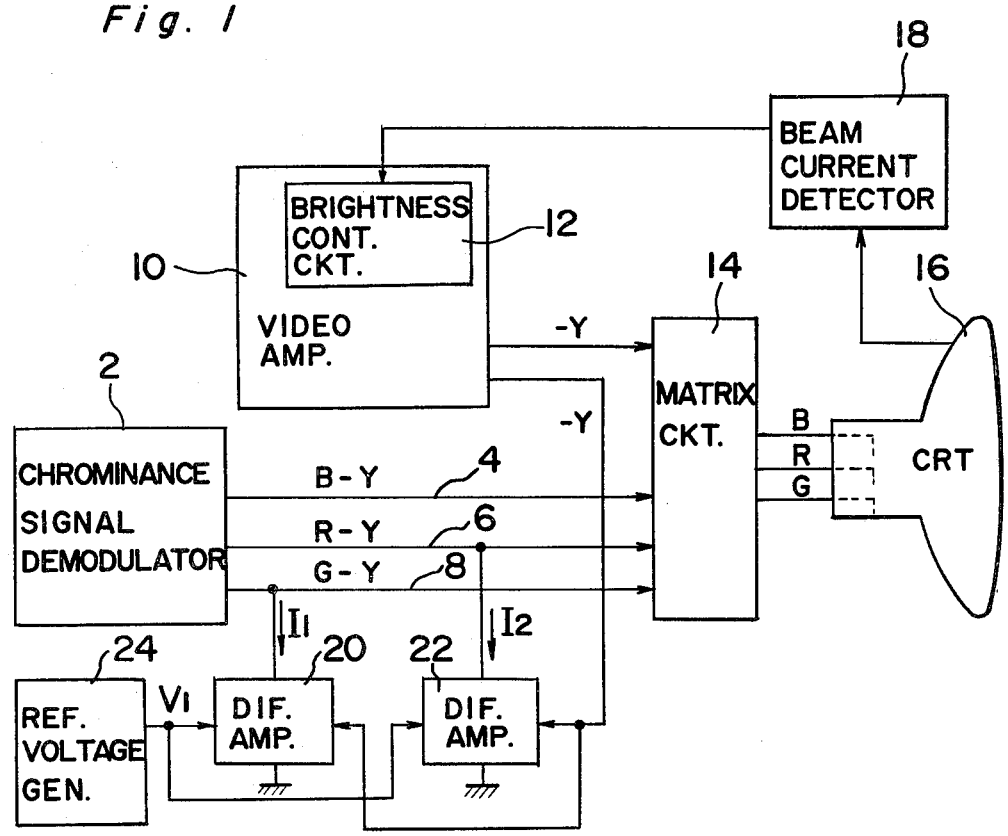
FIG. 1 is a block diagram of color temperature control circuit employed in a color television receiver.

Referring to FIG. 1, a color television receiver includes a chrominance signal demodulator 2 for producing blue, red and green chrominance signals B-Y, R-Y and G-Y, respectively, through lead lines 4, 6 and 8, a video amplifier 10 for producing luminance signal $-Y$, and a matrix circuit 14 for receiving the chrominance signals B-Y, R-Y and G-Y and also the luminance signal $-Y$ to produce blue, red and green color signals B, R and G. These color signals B, R and G are applied to a cathode ray tube 16 in which blue, red and green electron beams are produced to form a color image on a phosphor screen of the cathode ray tube 16. The total current of electron beam is detected by a beam current detector 18 which, upon detection of beam current off from a predetermined level, produces a signal towards a brightness control circuit 12 included in the video amplifier 10 for increasing or decreasing the color signals B, R and G without changing the ratio of their level, to correct the brightness. The beam current detector 18 together with the brightness control circuit 12 constitutes an automatic brightness limiter (ABL).

A color temperature control circuit according to the present invention comprises a first differential amplifier 20 which is connected to the lead line 8 carrying the green chrominance signal G-Y and a second differential amplifier 22 which is connected to the lead line 6 carrying the red chrominance signal R-Y. In each of the differential amplifiers 20 and 22, the luminance signal $-Y$ is compared with a reference voltage V1 obtained from a reference voltage generator 24, and when the luminance signal −Y drops below the reference voltage V1, the differential amplifiers 20 and 22 are actuated to derive a current from each of the currents flowing through the lead lines 8 and 6 to reduce the current level of the red and green chrominance signals R-Y and G-Y. The derived current I1 from the lead line 8 and the derived current I2 from the line 6 are proportional to the degree of voltage drop of the luminance signal −Y below the reference voltage V1 and their specific value are determined by the circuit components, such as resistors and transistors, contained in each differential amplifier.

Figure 2:
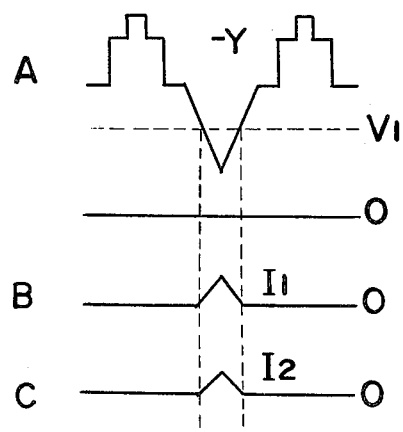
FIG. 2 is a graph showing waveforms of luminance signal and derived chrominance signals.

Referring to FIG. 2, there is shown an example of waveforms of luminance signal −Y and derived currents I1 and I2. When the luminance signal −Y (waveform A) drops below the reference voltage V1 in a waveform of V, the derived currents I1 and I2 (waveforms B and C) show waveform of inverted V. Due to the difference in the specific value of the circuit components in the differential amplifiers 20 and 22, the peak value of the derived current I1 differs from that of the derived current I2. When such a difference is expressed by way of ratio between currents I1 and I2, it has a ratio equal to the demodulation ratio of chrominance signal of G-Y to R-Y.

Figure 3:
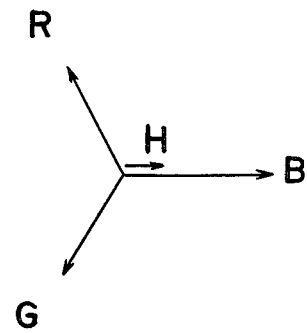
FIG. 3 is a vector diagram of color signals B, R and G and their sum vector.

When these currents I1 and I2 flow through the respective differential amplifiers, the current level of the chrominance signals R-Y and G-Y drops, and accordingly, the current level of the chrominance signal B-Y holds higher level than those of the chrominance signals R-Y and G-Y. And, when these chrominance signals B-Y, R-Y and G-Y pass through the matrix circuit 14, they are changed to color signals which can be depicted in a vector form with an angle of 120° spaced from each other, as shown in FIG. 3. As apparent from FIG. 3, vectors of color signals R and G are smaller than the vector of color signal B, and this is understood to be caused by the above described current derive in the chrominance signals R-Y and G-Y. Accordingly the sum of the vectors of color signals R, G and B results in a small vector H in a direction of blue.

Furthermore, when the current level of the color signals R and G are taken into consideration, they are reduced and thus, the total current level of electron beam is reduced to soften the contrast between white image (now it is turned to bluish white image) and background, presenting a sharp image on the cathode ray tube.

In the case where the bluish white image lasts for a predetermined period of time to reduce the average of total beam current during said predetermined period of time, the automatic brightness limiter is actuated to increase each of the color signals B, R and G without changing the ratio therebetween. Accordingly, in this case, the bluish white is further emphasized, and the image is further sharpened.

On the contrary, when the bluish white image disappears instantaneously, the average of total beam current hardly changes, and accordingly, in this case, the succeeding image is produced without actuating the automatic brightness limiter.

Figure 4:
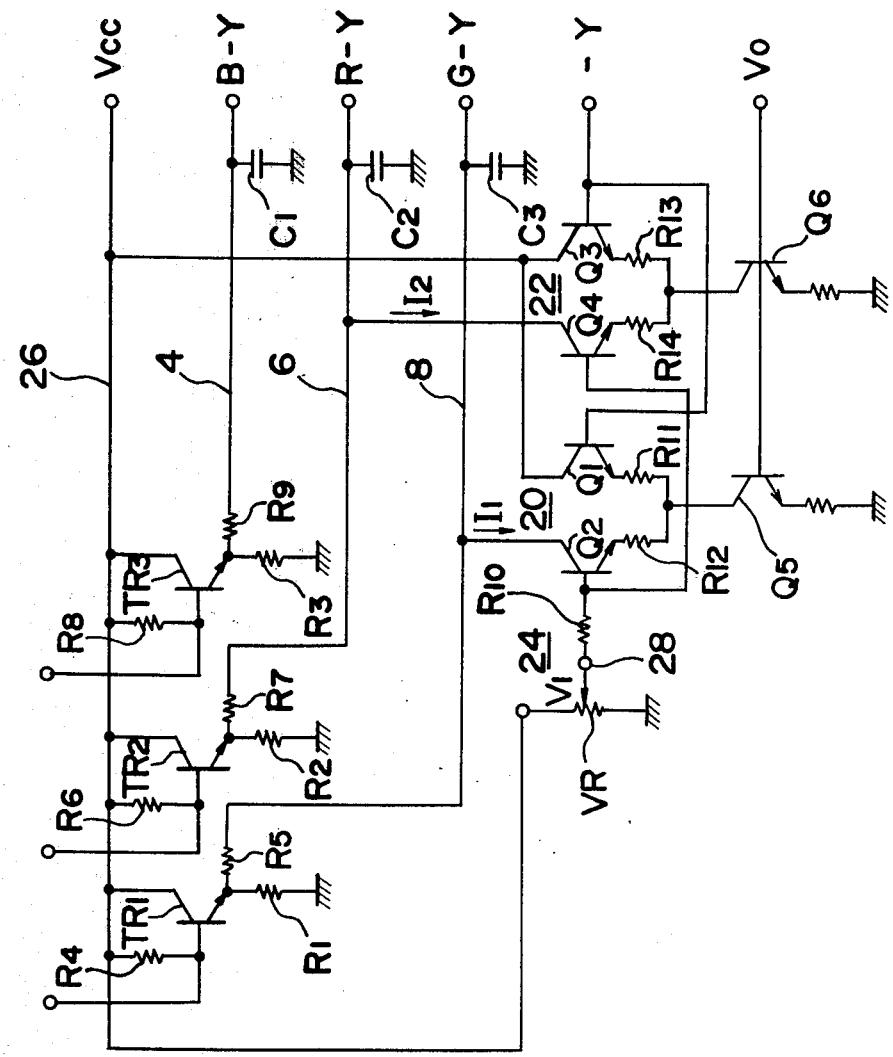
FIG. 4 is a circuit diagram of color temperature control circuit according to one embodiment of the present invention.

Referring to FIG. 4, there is shown one embodiment of the color temperature control circuit according to the present invention. In the drawing of FIG. 4, only the output stage of the chrominance signal demodulator 2 is shown and which includes, for the green chrominance signal G-Y, an emitter follower transistor TR1 and an emitter-connected resistor R1 for the impedance matching, and resistors R4 and R5 and capacitor C3 for filtering 3.58 MHz, i.e., for preventing 3.58 MHz signal from being produced from the output of the demodulator 2. Therefore, the green chrominance signal G-Y is produced from the resistor R5 along the lead line 8. Similarly, for the red chrominance signal R-Y, there are provided emitter follower transistor TR2, resistors R2, R6 and R7 and capacitor C2, and for the blue chrominance signal B-Y, there are provided emitter follower transistor TR3, resistors R3, R8 and R9 and capacitor C1. The collector of each emitter follower transistors TR1, TR2 and TR3 is connected to a source of voltage Vcc through a lead line 26.

The differential amplifier 20 comprises a pair of transistors Q1 and Q2 having their emitters connected with each other through series connected resistors R11 and R12, and a junction between the resistors R11 and R12 is connected to ground through a transistor Q5 which, upon receipt of voltage Vo to its base, produced a constant current. The base of the transistor Q1 is connected to the video amplifier 10 for receiving the luminance signal −Y, and the base of the transistor Q2 is connected to a current regulating resistor R10 which is in turn connected to a terminal 28. The terminal 28 is connected to a variable resistor VR for supplying the reference voltage V1 to the base of the transistor Q2. Thus, the variable resistor VR and the resistor R10 constitutes the reference voltage generator 24. The collector of the transistor Q1 is connected to the lead line 26 carrying the voltage Vcc and the collector of the transistor Q2 is connected to the lead line 8 carrying the green chrominance signal G-Y.

Likewise, the differential amplifier 22 comprises a pair of transistors Q3 and Q4 having their emitters connected with each other through series connected resistors R13 and R14, and a junction between the resistors R13 and R14 is connected to ground through a transistor Q6 producing a constant current. The base of the transistor Q3 is connected to the video amplifier 10 and the base of the transistor Q4 is connected to the resistor R10 of the reference voltage generator 24. The collector of the transistor Q3 is connected to the lead line 26 and the collector of the transistor Q4 is connected to the lead line 6 carrying the red chrominance signal R-Y.

In operation, when the luminance signal −Y is above the reference voltage V1, i.e., when the luminance signal −Y is relatively small, the transistors Q1 and Q3 are turned on and the transistors Q2 and Q4 are turned off. Accordingly, in this case, no derive currents I1 and I2 flows through the transistors Q2 and Q4. Then, when the luminance signal −Y drops below the reference voltage V1, the transistors Q1 and Q3 are turned off and the transistors Q2 and Q4 are turned on with a conductivity determined by the degree of voltage difference between the luminance signal −Y and the reference voltage V1. Accordingly, each of the derive currents I1 and I2 flows through the transistors Q2 and Q4, respectively, in an amount proportional to the above mentioned voltage difference. When this current derivation takes place, the ratio of chrominance signals B-Y, R-Y and G-Y as produced from the chrominance signal demodulator 2 is changed such that the chrominance signals R-Y and G-Y lose their rate and the chrominance signal B-Y gains its rate. Therefore, the white image on the cathode ray tube 16 first shows soft bluish white, and then, in a moment the bluish white is further emphasized, in the manner mentioned above by the effect of automatic brightness limiter.

Figure 5:
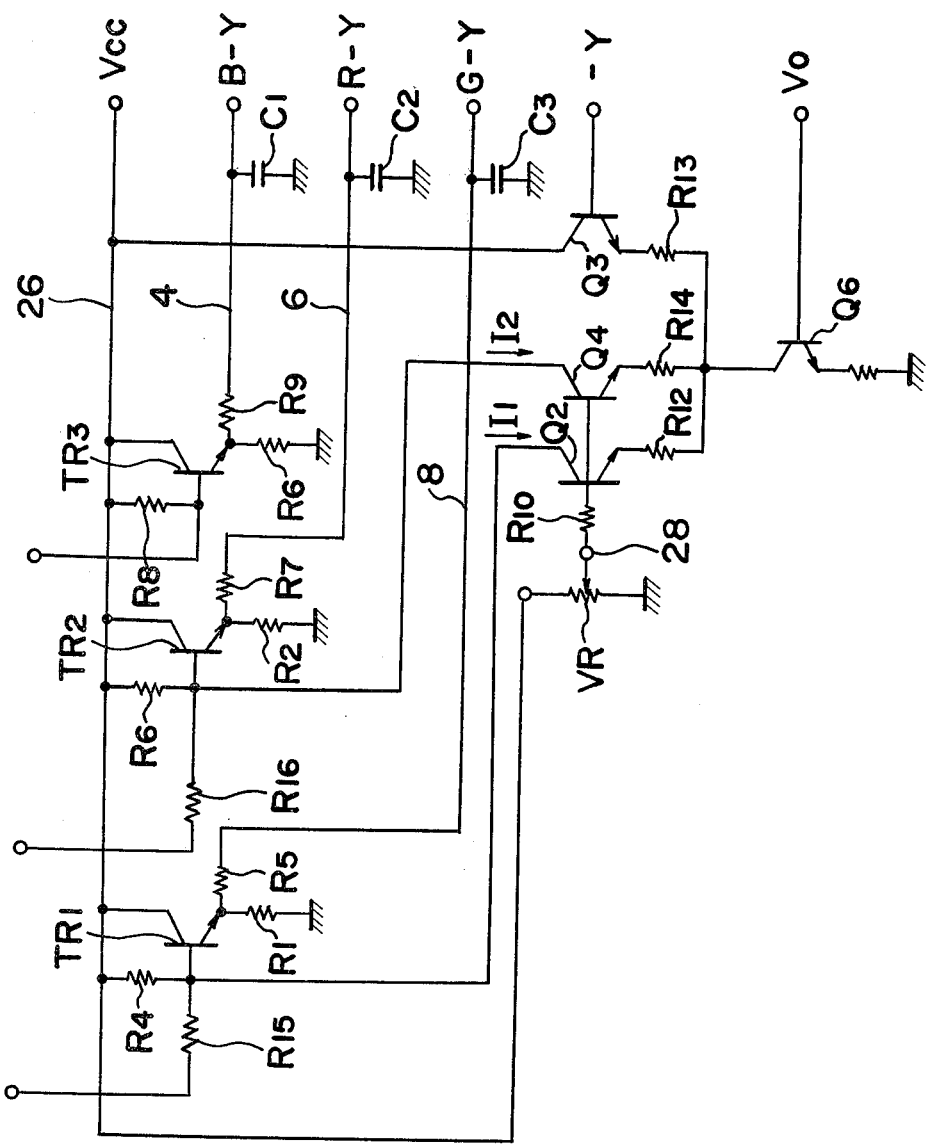
FIG. 5 is a circuit diagram similar to FIG. 4, but particularly showing a modification thereof.

Referring to FIG. 5, there is shown a modification of the color temperature control circuit. When compared with the circuit of FIG. 4, the modified circuit shown in FIG. 5 has eliminated the transistors Q1 and Q5, and resistor R11 so as to simplify the circuit arrangement. Furthermore, in the modification of FIG. 5, the collectors of the transistors Q2 and Q4 are connected to the bases of the transistors TR1 and TR2, respectively, to derive the current of green and red chrominance signals. In this case, the base of the transistors TR1 and TR2 are further inserted with resistors R15 and R16.

Since the color temperature control circuit according to the present invention is formed by differential amplifiers, the control of current level to be derived can be carried out with high preciseness and stability. Furthermore, the circuit arrangement of the color temperature control circuit excluding the variable resistor is suitable for being formed in a chip of integrated circuit together with other circuits, e.g., chrominance signal demodulator 2 and video amplifier 10.

Moreover, according to the present invention, since the chrominance signals R-Y and G-Y are first temporarily reduced to cause the apparent increase of the chrominance signal B-Y, there will be no saturation of the chrominance signal B-Y. Accordingly, the change of white to bluish white can be done without deteriorating the sharpness of the image.

Although the present invention has been fully described with reference to the accompanying drawings, many modifications and variations will now be apparent to those skilled in the art, and the scope of the present invention is therefore to be limited not by the details of the preferred embodiment described above, but only by the terms of appended claims.

What is claimed is:

1. A color temperature control circuit for use in a color television receiver for changing the ratio of blue, red and green chrominance signals obtained from a chrominance signal demodulator in relation to a luminance signal obtained from a video amplifier, said color temperature control circuit comprising:
a reference voltage generator for generating a predetermined reference voltage;
a first differential amplifier connected to said chrominance signal demodulator for defining a first current path for said green chrominance signal to ground, said first differential amplifier also connected to said reference voltage generator and said video amplifier for comparing said luminance signal with said reference voltage such that when said luminance signal drops below said reference voltage, said first current path actuates to conduct said green chrominance signal to ground with a conductivity determined by the degree of said voltage drop of luminance signal below said reference voltage to reduce the green chrominance signal level; and
a second differential amplifier connected to said chrominance signal demodulator for defining a second current path for said red chrominance signal to ground, said second differential amplifier also connected to said reference voltage generator and said video amplifier for comparing said luminance signal with said reference voltage such that when said luminance signal drops below said reference voltage, said second current path actuates to conduct said red chrominance signal to ground with a conductivity determined by the degree of said voltage drop of luminance signal below said reference voltage to reduce the red chrominance signal level.

2. A color temperature control circuit as claimed in claim 1, wherein said first differential amplifier comprises: a first transistor having its base connected to said video amplifier for receiving said luminance signal; a second transistor having its base connected to said reference voltage generator for receiving said reference voltage and its collector connected to said chrominance signal demodulator for receiving said green chrominance signal, said second transistor serving as said first current path; and a first constant current source connected to emitter of each of said first and second transistors.

3. A color temperature control circuit as claimed in claim 2, wherein said second differential amplifier comprises: a third transistor having its base connected to said video amplifier for receiving said luminance signal; a fourth transistor having its base connected to said reference voltage generator for receiving said reference voltage and its collector connected to said chrominance signal demodulator for receiving said red chrominance signal, said fourth transistor serving as said second current path; and a second constant current source connected to emitter of each of said first and second transistors.

4. A color temperature control circuit as claimed in claim 2, wherein said second differential amplifier comprises: said first transistor; a third transistor having its base connected to said reference voltage generator for receiving said reference voltage and its collector connected to said chrominance signal demodulator for receiving said red chrominance signal; and said first constant current source connected to emitter of said third transistor.

5. A color temperature control circuit as claimed in claim 1, wherein said first and second differential amplifiers comprise first and second resistors, respectively, inserted into said first and second current paths for regulating the current flowing through the respective current paths such that the ratio of resistance of said first and second resistors is equal to the ratio of level of said green and red chrominance signals.

6. A color temperature control circuit as claimed in claim 1, wherein said reference voltage generator comprises a variable resistor.

7. A color temperature control circuit as claimed in claim 1, wherein said first and second differential amplifiers are assembled on a chip of integrated circuit.

* * * * *